United States Patent [19]

Zenhausern et al.

[11] 4,102,639
[45] Jul. 25, 1978

[54] AMINE SALTS OF REACTIVE DYESTUFFS

[75] Inventors: Anton Zenhausern, Oberwil; Otto Reber, Basel; Peter Aeschlimann, Allschwil, all of Switzerland

[73] Assignee: Ciba-Geigy Corporation, Ardsley, N.Y.

[21] Appl. No.: 728,194

[22] Filed: Sep. 30, 1976

Related U.S. Application Data

[60] Division of Ser. No. 495,517, Aug. 7, 1974, Continuation-in-part of Ser. No. 201,560, Nov. 23, 1971.

[30] Foreign Application Priority Data

Nov. 24, 1970 [CH] Switzerland .................. 17418/70

[51] Int. Cl.² .............................................. D06P 1/38
[52] U.S. Cl. ............................................... 8/1 A; 8/1 C;
8/39 B; 8/39 R; 8/41 B; 8/41 R; 8/85 B; 8/85 R; 8/94 A; 8/94 R; 8/172 A; 8/172 R; 8/173; 8/178 R; 8/DIG. 2
[58] Field of Search ............ 8/41 R, 1 A, 1 C, 172 R, 8/85 R, 94 R, DIG. 2, 39 R, 39 B, 41 B, 85 B, 172 A, 178 R, 94 A, 173

[56] References Cited

U.S. PATENT DOCUMENTS

| | | | |
|---|---|---|---|
| 2,038,298 | 4/1936 | Kiernan | 260/44.6 |
| 2,095,077 | 10/1937 | Payne | 260/60 |
| 2,315,870 | 4/1943 | Nadler | 260/208 |
| 2,670,265 | 2/1954 | Heyna | 8/49 |
| 3,170,912 | 2/1965 | Freyermuth | 260/163 |
| 3,170,914 | 2/1965 | Freyermuth et al. | 260/199 |
| 3,193,546 | 7/1965 | Freyermuth | 260/200 |
| 3,925,012 | 12/1975 | Ringel et al. | 8/169 |

FOREIGN PATENT DOCUMENTS

| | | |
|---|---|---|
| 7,000,770 | 1/1970 | Japan. |
| 994,979 | 6/1965 | United Kingdom. |
| 1,220,778 | 1/1971 | United Kingdom. |
| 1,260,262 | 1/1972 | United Kingdom. |

OTHER PUBLICATIONS

Farben Revue, (1971, Special Edition 13), p. 16.
Rattee and Breuer, "The Physical Chemistry of Dye Adsorption" (Academic Press, 1974), pp. 260–261 and 302–305.

Primary Examiner—A. Lionel Clingman
Attorney, Agent, or Firm—Wenderoth, Lind & Ponack

[57] ABSTRACT

New amine salts of reactive dyestuffs as well as the use of these amine salts for the dyeing and printing of organic material are disclosed. The new dyestuffs contain an amine salt of an acid, salt-forming, water-solubilizing group, and are of the formula $$D-[X]_{n-1}SO_2-CH_2CH_2-Z^{\ominus}\,[Y-H]-H^{\oplus} \qquad (I)$$

wherein D represents the radical of an organic dyestuff selected from an azo, formazan, anthraquinone, phthalocyanine, nitro and triphenylmethane dyestuff containing no salt-forming, water-solubilizing groups, X represents the bridge member $-CH_2-$, $-CH_2CH_2-$ or

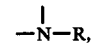

wherein R represents hydrogen, alkyl having 1 to 5 carbon atoms, or cycloalkyl, $Z^{\ominus}$ represents $-OSO_3^{\ominus}$, $-SSO_3^{\ominus}$ or $-OPO_3H^{\ominus}$, Y represents the radical of certain primary or secondary amines Y-H, which amines are capable of salt formation and $n$ represents the number 1 or 2.

The new amine salts of reactive dyestuffs are characterized by their good to excellent solubility in nonpolar aprotic solvents or mixtures of solvents.

14 Claims, No Drawings

AMINE SALTS OF REACTIVE DYESTUFFS

This is a Division, of application Ser. No. 495,517, filed Aug. 7, 1974.

This application is a continuation-in-part of our pending application Ser. No. 201,560, filed Nov. 23, 1971.

The present invention relates to new amine salts of reactive dyestuffs, to processes for the production thereof, as well as to the use of the new amine salts for the dyeing and printing of organic material, especially of fibre material made from synthetic polyamides, and to the material dyed or printed with the new amine salts.

It has been found that new valuable amine salts of reactive dyestuffs of the general formula I:

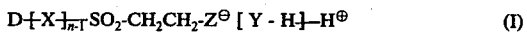  (I)

wherein

D represents the radical of an organic dyestuff selected from an azo dyestuff optionally containing heavy metal, a formazan, anthraquinone, phthalocyanine, nitro and triphenylmethane dyestuff containing no salt-forming, water-solubilising groups, X represents the bridge member —CH$_2$—, —CH$_2$—CH$_2$— or

wherein R represents hydrogen, alkyl having 1 to 5 carbon atoms, or cycloalkyl, Z$^\ominus$ represents —OSO$_3^\ominus$, —SSO$_3^\ominus$ or —OPO$_3$H$^\ominus$, Y represents the radical of a primary or secondary amine Y-H, which amine is capable of salt formation, and is selected from the group consisting of 1. a mono- or dialkylamine having a total of from 2 to 20 carbon atoms in the alkyl groups which groups are unsubstituted or are substituted by hydroxy or methoxy;
2. a mono- or dicycloalkylamine which is unsubstituted or substituted by alkyl of from 1 to 8 carbon atoms or hydroxylower-alkyl;
3. a mononuclear, mono- or diaralkylamine which is unsubstituted or substituted by alkyl which is unsubstituted or substituted by hydroxy, methoxy or cyano;
4. a mononuclear aromatic amine;
5. benzamidine, or an alkylamidine having from 2 to 18 carbon atoms in the alkyl radical and which may be substituted by alkyl of from 1 to 4 carbon atoms, phenyl, benzyl or cyclohexyl;
6. an isothiourea S-substituted by benzyl or alkyl of from 1 to 18 carbon atoms;
7. an N-containing five- or six-membered heterocycle and
8. a condensed N-containing heterocycle; and n represents the number 2, or preferably 1, are obtained by the reaction of a) a dyestuff of the general formula II:

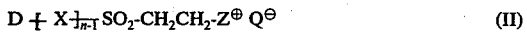  (II)

wherein D, X, Z$^\ominus$ and n have the meanings given under formula I, and Q$^\oplus$ represents an alkali metal cation or the ammonium cation, with a salt of an amine of the general formula III:

Y - H  (III)

wherein Y has the meaning given under formula I, in a molar ratio of at least 1:1, the reaction being advantageously performed in an aqueous, aqueous-organic or organic solution, or b) a dyestuff of the general formula II':

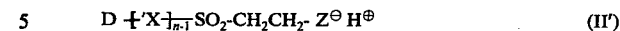  (II')

wherein D, X, Z$^\ominus$ and n have the meanings given under formula I with an amine of the general formula III:

Y - H  (III)

wherein Y has the meaning given under formula I, in a molar ratio of at least 1:1, the reaction being advantageously performed in an aqueous, aqueous-organic or organic solution.

The radical  in formula I is bound direct to a carbon atom of an aromatic ring of D.

The new amine salts of reactive dyestuffs of formula I are particularly suitable for the dyeing and printing of organic fibre material from organic solvents, particularly aprotic solvents.

Amine salts of reactive dyestuffs containing acid salt-forming, water-solubilising groups, such as sulphonic acid groups or carboxylic acid groups, are known from the literature, as well as the employment of amine salts of non-reactive anionic dyestuffs for the dyeing of synthetic polyamide fibre material from organic solvents. Compared with the first-mentioned amine salts, the amine salts of reactive dyestuffs according to the invention are distinguished by a better solubility in aprotic organic solvents, whilst the dyeings produced from organic aprotic solvents with the use of reactive amine salts according to the invention are distinguished, compared with dyeings obtained with corresponding amine salts of non-reactive anionic dyestuffs, by better wet fastness properties.

In formula I, D represents, in particular, the radical of a technically readily accessible organic dyestuff, e.g. the radical of an azo dyestuff optionally containing heavy metal, of a formazan, anthraquinone, phthalocyanine, nitro, or triphenylmethane dyestuff, preferably of an azo or an anthraquinone dyestuff.

If D is the radical of an azo dyestuff, then it is, for example, the radical of a metal-free or metal-containing mono- or disazo dyestuff.

The monoazo dyestuffs are, e.g. from the class: benzene-azo-benzene, benzene-azo-naphthalene, benzene-azo-pyrazole, benzene-azo-acetoacetylarylide, naphthalene-azo-naphthalene, and naphthalene-azo-pyrazole; whereas disazo dyestuffs belong, e.g. to the class of the benzene-azo-benzene-azo-benzene, benzene-azo-naphthalene-azo-benzene naphthalene-azo-benzene-azo-benzene and benzene-azo-benzene-azo-pyrazole series.

If D represents the radical of a formazan dyestuff, then the dyestuffs concerned are, e.g. di- or tricyclic, metal-containing formazan dyestuffs, or formazan-azo-dyestuffs.

If D is the radical of an anthraquinone dyestuff, then it is preferably the 1-amino-, 1-alkylamino-, 1-hydroxy-, 1-alkoxy- or 1-aryloxy-4-phenylamino- or -4-(diphenyl)-amino-anthraquinone radical.

If D represents the radical of a phthalocyanine dyestuff, it is preferably the radical of a phthalocyaninesulphonic acid alkylamide or -arylamide.

The radical D is, as defined, free of salt-forming, water-solubilising groups such as sulphonic acid, carboxylic acid and phosphoric acid groups, or onium groups such as ammonium and sulphonium groups; it can, however, contain the substituents common in dyestuffs, e.g. halogen such as fluorine, chlorine or bromine; cyano or nitro groups; hydrocarbon groups, especially lower alkyl groups such as methyl, ethyl, isopropyl, tert.butyl; substituted lower alkyl groups, e.g. perfluoroalkyl groups such as trifluoromethyl; also hydroxyalkyl groups such as β-hydroxyethyl or γ-hydroxypropyl; ether groups, preferably lower alkoxy groups, but also aryloxy groups such as methoxy, ethoxy, butoxy, phenoxy, methylphenoxy; thioether groups, e.g. lower alkylthio and phenylthio groups such as methylthio, ethylthio, phenylthio; acyl groups such as lower alkanoyl, aroyl, lower alkylsulphonyl or arylsulphonyl groups; arylsulphonyloxy groups such as phenylsulphonyloxy groups; primary, secondary or tertiary amino groups; acylamide groups, especially lower alkanoylamide groups such as acetylamide; lower alkoxycarbonylamide groups such as ethoxycarbonylamide, or aroylamide groups such as benzoylamide groups; lower alkylsulphonylamide or arylsulphonylamide groups; carboxylic acid amide and sulphonic acid amide groups optionally mono- or disubstituted at the nitrogen atom, particularly N-lower alkyl- or N,N-di-lower-alkylsulphonic acid amide groups.

Here and in the following, the expression "lower" in connection with alkyl, alkoxy and alkanoyl groups denotes radicals having not more than 4 carbon atoms.

If X in formula I represents the bridge member

then R therein represents, in particular, the methyl, ethyl or cyclohexyl group; preferably, however, X represents the bridge member —CH$_2$—.

If Q$^\oplus$ in formula II is an alkali metal cation, this is, e.g. the lithium, sodium or potassium cation; preferably Q$^\oplus$ represents the sodium cation.

Particularly suitable organic nitrogen compounds as defined, from which the radical Y is derived, and which contain a primary or secondary nitrogen atom capable of salt formation, are, e.g. the following:
1. Substituted or unsubstituted mono- or dialkylamines such as butylamine, hexylamine, octylamine, decylamine, dodecylamine, tetradecylamine, octadecylamine, diethylamine, dibutylamine, di-n-hexylamine, dioctylamine, didodecylamine, N-methyl-N-dodecylamine, N-ethyl-N-octadecylamine, β-hydroxyethylamine, γ-hydroxypropylamine, N-β-hydroxyethyl-N-dodecylamine, γ-methoxypropylamine, N-γ-methoxypropyl-N-dodecylamine and N-β-hydroxyethyl-N-octadecylamine.
2. Substituted or unsubstituted mono- or dicycloalkylamines such as cyclohexylamine, trimethylcyclohexylamine, N-methylcyclohexylamine, N-octylcyclohexylamine, N-β-hydroxyethylcyclohexylamine and dicyclohexylamine.
3. Substituted or unsubstituted mononuclear, mono- or diaralkylamines such as benzylamine, β-phenylethylamine, N-β-hydroxyethylbenzylamine, N-γ-methoxypropylbenzylamine, N-β-cyanoethylbenzylamine, N-octylbenzylamine, N-octadecylbenzylamine and dibenzylamine.
4. Substituted or unsubstituted aromatic amines, particularly mononuclear aromatic amines such as aniline, N-methylaniline and toluidine.
5. Substituted or unsubstituted amidines, preferably alkylamidines such as acetamidine, benzamidine, laurylamidine, stearylamidine, as well as N-methyllaurylamidine, N-butyllaurylamidine, N-phenyllaurylamidine, N-benzyllaurylamidine, N-methylstearylamidine, N-benzylstearylamidine or N-cyclohexylstearylamidine.
6. Substituted isothioureas, preferably S-alkylisothioureas such as S-benzylisothiourea, S-methyl-, S-butyl-, S-hexyl-, S-octyl-, S-undecyl-, S-dodecyl- and S-octadecylisothiourea.
7. N-containing five- and six-membered heterocycles, which can be partially or completely saturated.

Suitable five-membered, N-containing heterocycles are, e.g.: pyrrole; pyrrolidine; pyrrolidones such as α,β-butyrolactam and β,γ-butyrolactam; also pyrazoles; pyrazoline; pyrazolidine; imidazole and, in particular, unsubstituted and substituted 2-alkylimidazolines such as 2-heptylimidazoline, 2-undecylimidazoline, 2-heptadecylimidazoline; and, finally, aminotriazoles such as 3-acylamino- and 5-amino-1,2,4-phenyltriazole.

Suitable six-membered, N-containing heterocycles are, e.g.: piperidine; piperazine; morpholine and pyrimidines such as tetrahydropyrimidines, preferably 2-alkyltetrahydropyrimidines, e.g. 2-heptyltetrahydropyrimidine, 2-undecyltetrahydropyrimidine and 2-heptadecyltetrahydropyrimidine.
8. Condensed N-containing heterocycles such as indoline and indole.

Secondary alkylamines and secondary cycloalkylamines having a total of 7 to 18 carbon atoms are preferred, such as di-n-butylamine, di-n-hexylamine, dioctylamine, N-methylcyclohexylamine and dicyclohexylamine.

In preferred compounds of formula I, D represents the radical of an azo dyestuff or the radical of an anthraquinone dyestuff, n represents the number 1, Z$^\ominus$ represents the —OSO$_3^\ominus$ group, and Y represents the radical of a secondary alkylamine or of a secondary cycloalkylamine having in all 7 to 18 carbon atoms, especially the N-methylcyclohexylamine, dicyclohexylamine or di-n-hexylamine radical.

Suitable salts of an amine of formula III are, in particular, the corresponding acetates, chlorohydrates or sulphates.

The starting dyestuffs of formula II and II' are known and can be obtained by production processes known to the expert.

In the case of the reaction of a dyestuff of formula II with the salt of an amine of formula III, or of a dyestuff of formula II' with an amine of formula III, the reaction temperature is advantageously so chosen that the dyestuff amine salts of formula I precipitate in crystalline form, and can thus be easily separated. The amine salts of formula I are usually precipitated at temperatures of 10° to 50° C, especially 10° to 20° C, and subsequently isolated in a manner known per se, e.g. by filtration at a temperature of 10° to 20° C, and then dried.

If the reaction is performed in an aqueous-organic or organic medium, then suitable inert organic solvents are, e.g. methanol, dimethylformamide, acetone, dioxane, methyl ethyl ketone, ethylene glycol monomethyl or -ethyl ether, toluene, trichloroethylene and chloroform, whereby the amine salts, in the case of the use of water-insoluble solvents, can be isolated by phase separation, e.g. in a separating funnel, and subsequent concentration of the organic phase in a rotary evaporator.

The new amine salts of reactive dyestuffs are in the form of coloured powders the colour of which depends on the chromophorous system and the auxochromes present. The said new amine salts are suitable for the dyeing and printing of organic materials of the most diverse kinds by methods known per se. Suitable organic fibre material is, e.g. fibre material made from acid modified synthetic fibres, such as acid modified polyamide, polyurethane, polyacrylonitrile and polyester fibres, e.g. from linear high-molecular esters of aromatic polycarboxylic acids with polyfunctional alcohols, such as polyethylene glycol terephthalate, especially, however, fibre material made from synthetic polyamides.

Examples of fibre material made from synthetic polyamide, which can be dyed and printed with the amine salts according to the invention, are as follows: condensation products from hexamethylenediamine and adipic acid (polyamide 6.6) or sebacic acid (polyamide 6.10), or mixed condensation products, e.g. from hexamethylenediamine, adipic acid and $\epsilon$-caprolactam (polyamide 6.6/6), also polymerisation products from $\epsilon$-caprolactam, known under the trade-names of "Nylon 6", "Perlon", "Grilon" or "Enkalon", or from $\omega$-aminoundecanoic acid (polyamide 11 or "Rilsan").

Also applicable are mixtures of the stated fibres, especially mixtures of cotton or synthetic polyamide fibres and polyethylene glycol terephthalate fibres.

These fibres can be dyed or printed in any desired form from an aqueous medium with the amine salts of reactive dyestuffs according to the invention, e.g. in the form of loose material, threads, yarn, knitted goods and fabrics, etc., with application of the known processes usual for reactive dyestuffs.

A particular advantage of the amine salts of reactive dyestuffs according to the invention is that they are excellently suitable, in contrast to the corresponding alkali metal salts or ammonium salts, for application from organic solvents.

The present invention concerns, therefore, also a process for the dyeing or printing of organic fibre material, such as fibre material made from linear high-molecular esters of aromatic polycarboxylic acids with polyfunctional alcohols and, in particular, fibre material made from synthetic polyamides or mixtures thereof, by application of amine salts of reactive dyestuffs of the general formula I according to the invention in an organic solvent, or solvent mixture consisting of a non-polar, aprotic organic solvent and, optionally, a polar organic solvent, the solvent or solvent mixture optionally containing thickeners.

Suitable non-polar, aprotic organic solvents are, e.g. liquid hydrocarbons boiling above 30° C, i.e., aromatic hydrocarbons such as xylene or chlorobenzene, particularly dichlorobenzene, trichlorobenzene or tetrahydronaphthalene; aliphatic hydrocarbons such as hexane, heptane, octane or decane; aliphatic perfluorohydrocarbons such as perfluorohexane or perfluoroheptane; and cycloaliphatic hydrocarbons such as cyclohexane, especially cyclohexene. Preferably used, however, on account of their generally better regeneration properties and noncombustibility, are lower aliphatic halogenated hydrocarbons, particularly lower aliphatic chlorinated hydrocarbons, e.g. dichloromethane, chloroform, carbon tetrachloride, trichloroethylene, tetrachloroethylene ("perchloroethylene"), trichloroethane, tetrachloroethane, also tribromoethylene, 1,1,2-trichloro-2,2,1-trifluoroethane, 1,1,1,2-tetrachloro-2,2-difluoroethane, pentachlorofluoroethane, or 1-chloro-3-fluoropropane. Also mixtures of such solvents may be used. Furthermore, these solvents can contain — as is frequently the case with commercial products — stabilisers, such as, e.g. 1,1,1-trichloroethane, which is known under the trade-name of Chlorothene NU (Dow Chemical Co., Midland, Michigan, USA).

Particularly suitable as non-polar aprotic solvents are trichloroethylene and tetrachloroethylene.

Mentioned as polar organic solvents which can be used in admixture with the above mentioned non-polar aprotic solvents are, e.g. higher alkanols such as butanols or amyl alcohols, cycloaliphatic alcohols such as cyclohexanol, araliphatic alcohols such as benzyl alcohol, or aliphatic or cycloaliphatic ketones such as methyl ethyl ketone or cyclohexanone. Such polar organic solvents are preferred, however, which are miscible with water in any proportion. Examples of these are: monovalent lower aliphatic alcohols such as lower alkanols, e.g. methanol, ethanol, n- or isopropanol; alkylene glycol monoalkyl ether such as ethylene glycol monomethyl or -ethyl ether; also furfuryl or tetrahydrofurfuryl alcohol or bivalent aliphatic alcohols such as ethylene glycol or 1,2-propylene glycol; also lower aliphatic ketones such as acetone, lower cyclic ethers such as dioxane; lower anhydrous monocarboxylic acids such as anhydrous formic acid or propionic acid, and especially glacial acetic acid; N,N-dialkylamides of lower monocarboxylic acids such as dimethylformamide or dimethylacetamide; amides of carbonic acid such as N,N,N',N'-tetramethylurea; cyclic amides such as N-methylpyrrolidone; or lower carboxylic acid nitriles such as acetonitrile, as well as mixtures of such polar solvents.

In some cases, the employment of a solvent mixture consisting of 90 to 99 per cent by weight of trichloroethylene or tetrachloroethylene and 10 to 1 percnt by weight of an N,N-dialkylamide of a lower monocarboxylic acid, particularly dimethylacetamide, has proved to be advantageous.

If required, the dye liquor according to the invention may also contain thickeners, advantageously such which are soluble in the solvent or solvent mixture as defined.

The dyeing or printing of the fibre material is carried out using the usual discontinuous or advantageously the continuous processes, e.g. by the exhaust process, or by impregnation of the fibre material by nip-padding, spraying or printing, preferably, however, by padding.

The exhaust process is advantageously performed with a ratio of goods to liquor of about 1:5 to 1:100. After the heating of the dye liquor containing the material to be dyed to the desired dyeing temperature, which is governed by the chosen solvent or solvent mixture and by the type of fibre and which, in general, is between 40° and 130° C, dyeing is carried out at this temperature for about 5 to 45 minutes. Advantageously, after rinsing with a non-polar aprotic solvent, the dyeing is dried. Optionally, the dyeing can also be carried out above the boiling point of the solvent or solvent mixture in a closed system.

In the case of the padding process, the fibre material is advantageously passed at room temperature through the dye liquor, and subsequently squeezed out to obtain the desired content of impregnation solution of approximately 60 to 100 percent by weight, relative to the dry weight of the material being dyed. The major portion of the solvent remaining in the fibre material is usually subsequently removed under mild conditions, e.g. in a warm air-stream at temperatures of up to about 100° C, depending on the solvent or solvent mixture. The fixing of the dyestuff on the thus dried fibre material can be effected by steaming, e.g. with steam or with solvent vapours, or preferably by means of a dry heat treatment below the softening point of the fibre material. These two types of heat treatment may also be employed in a combined form. Suitable forms of dry heat treatment are contact heat, a dry hot air-stream, exposure to infrared radiation, or the action of high frequency alternating currents. The treatment which has, however, proved to be particularly satisfactory is the dry heat treatment by means of contact heat. In this operation, the predried fibre material is advantageously passed, depending on the type of fibre, for 10 to 30 seconds and at 150° to 230° C over heated rotating rollers. A further method of effecting fixing by means of contact heat, which has proved satisfactory especially in laboratory working, consists, for example, in the fixing of the dyeing for the appropriate times at the stated temperatures in a precision ironing press. A further possibility is for the fixing of the dyestuff to be effected, without prior intermediate drying, by a prolonged storage of the impregnated material at room temperature.

The amine salts can be added either in solid form, or in the form of concentrated stable solutions, to the dye liquors.

The process according to the invention renders possible the attainment, on the stated fibre material, of even and deeply coloured dyeings which, without an alkaline aftertreatment, have very good fastness properties, particularly fastness to wet processing, to rubbing and to dry-cleaning.

The following examples illustrate the invention. The temperatures are given in degrees Centigrade.

EXAMPLE 1

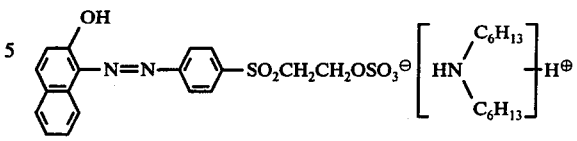

An amount of 4.6 g of the sodium salt of the monoazo dyestuff obtained by coupling of the diazotised sulphuric acid ester of 1-aminobenzene-4-($\beta$-hydroxyethylsulphone) with $\beta$-hydroxynaphthalene is dissolved at 50° in 50 ml of water; to the obtained solution are subsequently added, with stirring, 2.4 g of di-n.hexylamine hydrochloride. The amine salt of the above formula precipitates firstly in the form of an oily mass. The reaction mixture is maintained for a further 30 minutes at 50°, and then cooled to room temperature. The formed amine salt is afterwards taken up in methylene chloride or chloroform; the solution is then dried with sodium sulphate, filtered, and the solvent distilled off. The amine salt of the above formula is obtained, in quantitative yield, as orange powder.

If in the above example is used, instead of 2.4 g of di-n.hexylamine hydrochloride, an equivalent amount of 3,5,5-trimethylcyclohexylamine-1-hydrochloride, with otherwise the same procedure, then the amine salt of the formula:

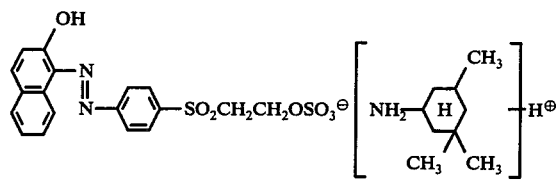

precipitates from the aqueous reaction mixture direct in crystalline form. The reaction product is filtered off, washed with water, and dried at 30 to 50° in vacuo. An orange powder is thus obtained in quantitative yield.

In the following table are listed further dyestuff amine salts which can be produced by the above described process. In the last column of the table are given the shades of the dyeings obtained with the corresponding amine salts on polyamide-6.6-fabric.

TABLE I

| Ex. No. | Dyestufff amine salt | Shade on polyamide-6.6-fabric |
|---|---|---|
| 2 | [structure with N=N-C6H4-SO2CH2CH2-OPO3H⊖ and H2N⊕ with two CH2(CH2)4CH3 groups; naphthalene-OH] | orange |
| 3 | [structure with HO, NH2-substituted naphthalene bearing O2S-N(C6H13-n)2, N=N-C6H4-SO2CH2CH2OSO3⊖ and H-N⊖-H with two CH2(CH2)4CH3 groups] | red |

TABLE I-continued

| Ex. No. | Dyestufff amine salt | Shade on polyamide-6.6-fabric |
|---|---|---|
| 4 | Ph—NHCOC(=N—N=)—C(CH$_3$)=C(OH)— ... —C$_6$H$_4$—SO$_2$CH$_2$CH$_2$OSO$_3^\ominus$ · [H$_3$N$^\oplus$—Ph] | yellow |
| 5 | [naphthol-azo structure: 1-amino-8-hydroxy-naphthalene with SO$_2$N(cyclohexyl)$_2$, azo-linked to C$_6$H$_4$—SO$_2$CH$_2$CH$_2$OSO$_3^\ominus$] · [H$_3$N$^\oplus$—C(CH$_3$)$_3$] | red |
| 6 | [same naphthol-azo dye as Ex. 5] · [H$_2$N$^\oplus$(CH$_2$CH$_3$)(CH$_2$(CH$_2$)$_{16}$CH$_3$)] | red |
| 7 | [same naphthol-azo dye] · [H$_2$N$^\oplus$(CH$_2$CH$_2$OH)(cyclohexyl)] | red |
| 8 | [same naphthol-azo dye] · [H$_2$N$^\oplus$(CH$_2$Ph)$_2$] | red |
| 9 | [same naphthol-azo dye] · [C$_{11}$H$_{23}$—C(=NH)(NH$_2$)·H]$^\oplus$ | red |

TABLE I-continued

| Ex. No. | Dyestufff amine salt | Shade on polyamide-6.6-fabric |
|---|---|---|
| 10 | [structure: naphthol-azo dye with OH, NH$_2$, sulfonamide N(cyclohexyl)$_2$, -SO$_2$CH$_2$CH$_2$OSO$_3^\ominus$ and pyrrolidinium H$_2$N$^\oplus$ counterion] | red |
| 11 | [structure: same naphthol-azo dye as Ex. 10 with -SO$_2$CH$_2$CH$_2$OSO$_3^\ominus$ and piperazinium-type H$_2$N$^\oplus$(CH$_2$CH$_2$)$_2$ counterion] | red |
| 12 | [structure: 1,4-diamino-anthraquinone with NH-CH(CH$_3$)CH$_2$CH$_3$ and NH-aryl-SO$_2$CH$_2$CH$_2$OSO$_3^\ominus$, counterion caprolactam-N-methyl ammonium] | greenish blue |
| 13 | [structure: 1,4-diamino-anthraquinone with NH-CH(CH$_3$)CH$_2$CH$_3$ and NH-aryl(CH$_3$)-CH$_2$SO$_2$CH$_2$CH$_2$OSO$_3^\ominus$, counterion C$_{17}$H$_{35}$-substituted imidazolinium] | blue |
| 14 | [structure: 2,4-di-tert-butyl phenol-azo-benzene-SO$_2$CH$_2$CH$_2$OSO$_3^\ominus$ with H$_2$N$^\oplus$(C$_6$H$_{13n.}$)$_2$ counterion] | yellow |
| 15 | [structure: 2-hydroxy-naphthalene-azo-benzene-SO$_2$CH$_2$CH$_2$OSO$_3^\ominus$ with H$_3$N$^\oplus$-C(CH$_3$)$_3$ counterion] | orange |
| 16 | [structure: 1-phenyl-3-methyl-5-hydroxy-pyrazole-azo-aryl-N(CH$_3$)-SO$_2$-C$_2$H$_4$-OSO$_3^\ominus$ with H$_2$N$^\oplus$(C$_6$H$_{13n.}$)$_2$ counterion] | yellow |

TABLE I-continued

| Ex. No. | Dyestuff amine salt | Shade on polyamide-6.6-fabric |
|---|---|---|
| 17 | 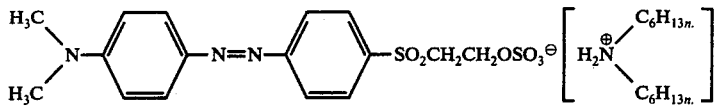 (structure with pyrazolone, $-N=N-$, $-CH_2CH_2SO_2-C_2H_4-OSO_3^\ominus$, and $[H_2\overset{\oplus}{N}(C_6H_{13n})_2]$) | yellow |
| 18 | $CuPc\left[SO_2NHCH_2CH_2-\underset{}{\bigcirc}-SO_2CH_2CH_2OSO_3^\ominus\right]_{2.2}\left[H_2\overset{\oplus}{N}\begin{array}{c}C_6H_{13n.}\\ \\C_6H_{13n.}\end{array}\right]_{2.2}$ | turquoise blue |
| 19 | (Cu-complexed bis-azo structure with pyrazolone, naphthol, $-OCH_3$, $-SO_2CH_2CH_2OSO_3^\ominus$, and $[H_2\overset{\oplus}{N}(C_6H_{13n})_2]$) | black |

EXAMPLE 20

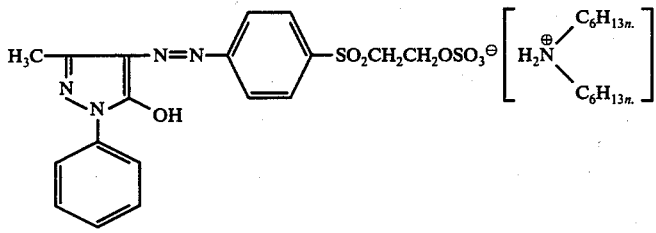

An amount of 4.5 g of the sodium salt of the monoazo dyestuff obtained by coupling of the diazotised sulphuric acid ester of 1-aminobenzene-4-(β-hydroxyethylsulphone) with N,N-dimethylaniline is dissolved at 50° in 300 ml of a water/methanol mixture (1:1); to the obtained solution are then added, with stirring, 2.3 g of di-n.hexylamine hydrochloride in 10 ml of methanol. As a result of the methanol being subsequently partially distilled off, the formed amine salt precipitates. It is filtered off, washed with a solution of methanol and water, and dried. The dyestuff amine salt of the above formula is obtained in the form of a yellow powder, which dissolves at 20° in trichloroethylene to the extent of at least 20 g in 1000 ml.

EXAMPLE 21

An amount of 4.9 g of the sodium salt of the monoazo dyestuff obtained by coupling of the diazotised sulphuric acid ester of 1-aminobenzene-4-(β-hydroxyethylsulphone) and 1-phenyl-3-methyl-5-pyrazolone is suspended at 50° in 100 ml of methanol, whereupon the pH-value of the obtained suspension is adjusted with concentrated hydrochloric acid to 4. After the addition of 2 g of di-n.hexylamine, dissolved in 10 ml of methanol, the amine salt precipitates; it is then filtered off and dried at 50° in vacuo. A yellow powder is thus obtained in good yield. The obtained dyestuff amine salt corresponds to the above formula, and is readily soluble in a mixture consisting of 1 part by volume of dimethylacetamide and 9 parts by volume of tetrachloroethylene.

Further dyestuff amine salts which can be produced by the process described in Example 21 are listed in the following Table II. In the last column of the table are given the shades of the dyeings obtained with the corresponding dye salts on polyamide-6.6-fabric.

$H_3C-\underset{\underset{N-N}{\parallel}}{\overset{}{\bigcirc}}-N=N-\underset{}{\bigcirc}-SO_2CH_2CH_2OSO_3^\ominus\left[H_2\overset{\oplus}{N}\begin{array}{c}C_6H_{13n.}\\ \\C_6H_{13n.}\end{array}\right]$ (with OH and phenyl substituents on pyrazole)

| Ex. No. | Dyestuff amine salt | Shade on polyamide-6.6-fabric |
|---|---|---|
| 22 | | red-violet |
| 23 | | blue |
| 24 | | reddish blue |
| 25 | | violet |
| 26 | | red |

EXAMPLE 27

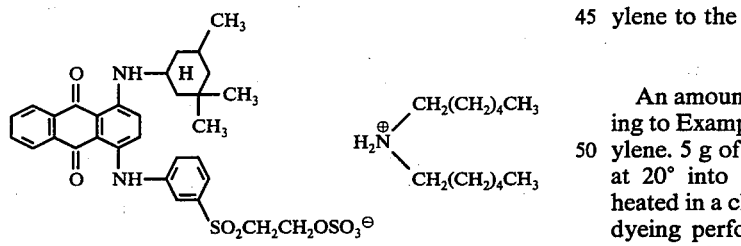

An amount of 4 g of the free sulphonic acid of the sulphuric acid ester of 1-trimethylcyclohexylamino-4-(4'-β-hydroxyethylsulphone)-phenylaminoanthraquinone is suspended at 25° in 500 ml of water; it is then dissolved by the addition of 100 ml of methanol, and to the solution are added, with stirring, 4 g of di-n-hexylamine. The formed amine salt thereupon precipitates as an oily mass. After two hours' standing, the aqueous phase is decanted off, and the oil/water mixture remaining behind extracted by being shaken twice with 100 ml of trichloroethylene each time. The separated trichloroethylene solutions are subsequently concentrated to dryness in a rotary evaporator with a bath temperature of 40°. Thus obtained are 4 g of the amine salt of the above formula, which is soluble in pure tetrachloroethylene to the extent of 400 g in one liter.

EXAMPLE 28

An amount of 0.1 g of the dyestuff amine salt according to Example 1 is dispersed in 99.5 g of tetrachloroethylene. 5 g of polyamide-6.6-staple fabric are introduced at 20° into the obtained dye liquor; the dye bath is heated in a closed system to 120° within 15 minutes, and dyeing performed for 30 minutes at this temperature. The obtained dyeing is subsequently rinsed with tetrachloroethylene, and dried at 100° in an air stream. By this means is obtained a deeply coloured orange dyeing having good fastness to light.

EXAMPLE 29

An amount of 5 g of the dyestuff amine salt according to Example 1 is dissolved in a solvent mixture consisting of 900 g of tetrachloroethylene and 100 g of dimethylacetamide. A fabric made from polyamide-6.6-filament is padded at room temperature with the above mentioned clear dye solution; the impregnated fabric is squeezed out to obtain a liquor content of ca. 60%, relative to the dry weight of the material; the fabric is then dried for 1 minute at ca. 100°. The dried dyeing is subsequently fixed for 30 seconds at 200° by contact heat. In this manner is obtained, without aftertreatment, a deeply coloured, even and well developed orange dyeing having very good fastness to light and to wet processing.

An even and well developed orange dyeing is likewise obtained by using in the above example, instead of a mixture of tetrachloroethylene and dimethylacetamide, a mixture of trichloroethylene and dimethylformamide (weight ratio 9:1).

EXAMPLE 30

An amount of 10 g of the dyestuff amine salt according to Example 15 is dissolved in 1000 g of water. The obtained clear orange dye solution is used to pad, at room temperature, a fabric made from polyamide-6.6-filament; the impregnated fabric is squeezed out to obtain a liquor content of ca. 80%, relative to the dry weight of the material; the fabric is then dried for 1 minute at ca. 100°. The dried dyeing is subsequently fixed for 30 seconds at 220° by contact heat. By this means is obtained, without any aftertreatment, a deeply coloured, even and well developed orange dyeing.

EXAMPLE 31

An amount of 10 g of the dyestuff amine salt according to Example 14 is dissolved in 970 g of tetrachloroethylene and 30 g of dimethylacetamide. With the obtained clear yellow dye solution is padded, at room temperature, a fabric made from polyamide-6.6-filament; the impregnated fabric is squeezed out to leave a liquor content of ca. 60%, relative to the dry weight of the material, and then dried for 1 minute at ca. 100°. The dried dyeing is subsequently fixed for 30 seconds at 220° by contact heat. By this means is obtained, without aftertreatment, an even and well developed yellow dyeing.

Dyeings of equal quality are obtained by replacing, in the above example, the 970 g of tetrachloroethylene by the same amount of trichloroethylene or trichloroethane, with otherwise the same procedure.

If in the above example is used, instead of a fabric made from polyamide-6.6-filament, one made from polyethylene glycol terephthalate filament, with otherwise the same procedure, then likewise is obtained on this material a well developed yellow dyeing.

EXAMPLE 32

An amount of 20 g of the dyestuff amine salt according to Example 20 is dissolved in 1500 g of trichloroethylene. With the obtained clear yellow dye solution is padded, at room temperature, a fabric made from polyethylene glycol terephthalate filament; the impregnated fabric is squeezed out to leave a liquor content of ca. 60%, relative to the dry weight of the material, and then dried for 1 minute at ca. 100°. The dried dyeing is subsequently fixed for 15 seconds at 220° by contact heat. By this means is obtained, without aftertreatment, a deeply coloured, even and well developed yellow dyeing.

Dyeings of equal quality are obtained by replacing, in the above example, the 1500 g of trichloroethylene by 1000 g of chloroform, with otherwise the same procedure.

EXAMPLE 33

An amount of 10 g of the dyestuff amine salt according to Example 14 is dissolved in 1000 g of chloroform. A fabric made from polyamide-6.6-filament is padded at room temperature with the above mentioned clear yellow dye solution; the impregnated fabric is squeezed out to obtain a liquor content of ca. 60%, relative to the dry weight of the material; the fabric is then dried for 1 minute at ca. 100°. The dried dyeing is subsequently fixed for 30 seconds by contact heat at 200°. In this manner is obtained, without aftertreatment, a deeply coloured, even and well developed yellow dyeing.

We claim:
1. A process for the dyeing of organic fibre material, comprising
    (a) impregnating this material with a solution of at least one amine salt of reactive dyestuffs of Formula I

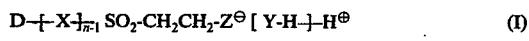

wherein D represents the radical of an organic dyestuff selected from an azo, formazan, anthraquinone, phthalocyanine, nitro and triphenylmethane dyestuff containing no salt-forming, water-solubilising groups, X represents the bridge member $-CH_2-$, $-CH_2CH_2-$ or

wherein R represents hydrogen, an alkyl group having 1 to 5 carbon atoms, or a cycloalkyl group, $Z^{\ominus}$ represents the $-OSO_3^{\ominus}$, $-SSO_3^{\ominus}$ or $-OPO_3H^{\ominus}$ group, Y represents the radical of a primary or secondary amine Y-H, which amine is capable of salt formation, and is selected from the group consisting of
    1. a mono- or dialkylamine having a total of from 2 to 20 carbon atoms in the alkyl groups which groups are unsubstituted or are substituted by hydroxy or methoxy;
    2. a mono- or dicycloalkylamine which is unsubstituted or substituted by alkyl of from 1 to 8 carbon atoms or hydroxylower-alkyl;
    3. a mononuclear, mono- or diaralkylamine which is unsubstituted or substituted by alkyl which is unsubstituted or substituted by hydroxy, methoxy or cyano;
    4. a mononuclear aromatic amine;
    5. benzamidine, or an alkylamidine having from 2 to 18 carbon atoms in the alkyl radical and which may be substituted by alkyl of from 1 to 4 carbon atoms, phenyl, benzyl or cyclohexyl;
    6. an isothiourea S-substituted by benzyl or alkyl of from 1 to 18 carbon atoms;
    7. an N-containing five- or six-membered heterocycle and
    8. a condensed N-containing heterocycle; and n represents the number 1 or 2,
    (I) in a solvent which consists of non-polar aprotic organic solvent selected from unsubstituted or halogenated hydrocarbons having a boiling point above 30° C, or
    (II) in a solvent mixture which consists of
        (α) non-polar aprotic organic solvent selected from unsubstituted or halogenated hydrocarbon having a boiling point above 30° C, and
        (β) a polar organic solvent selected from the group consisting of alkanols, cycloaliphatic alcohols, araliphatic alcohols, aliphatic or cycloaliphatic ketones, alkylene glycol monoalkyl ethers, furfuryl alcohol, tetrahydrofurfuryl alcohol, bivalent aliphatic alcohols, lower cyclic ethers, lower anhydrous monocarboxylic acids, N,N-dialkylamides of lower monocarboxylic acids, amides of carbonic acid, cyclic amides, lower carboxylic acid nitriles and mixtures thereof;
(b) removing a substantial part of excess dye liquor from the material and
(c) fixing the dyestuff by a subsequent heat treatment of the impregnated or printed fibre material at temperatures below the softening point of the fibre material, thereby obtaining a finished dyeing or print on the said fibre material.

2. A process for the dyeing of organic fibre material, which essentially comprises the steps of
(a) treating said fibre material at a goods: liquor ratio of at least 1:5 in the solution of at least one amine salt of reactive dyestuffs of Formula I

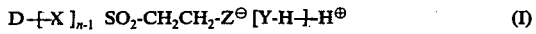

wherein D represents the radical of an organic dyestuff selected from azo, formazan, anthraquinone, phthalocyanine, nitro and triphenylmethane dyestuff containing no salt-forming, water-solubilising groups, X represents the bridge member $-CH_2-$, $-CH_2CH_2-$ or

wherein R represents hydrogen, an alkyl group having 1 to 5 carbon atoms, or a cycloalkyl group, $Z^\ominus$ represents the $-OSO_3^\ominus$, $-SSO_3^\ominus$ or $-OPO_3H^\ominus$ group, Y represents the radical of a primary or secondary amine Y-H, which amine is capable of salt formation, and is selected from the group consisting of 1. a mono- or dialkylamine having a total of from 2 to 20 carbon atoms in the alkyl groups which groups are unsubstituted or are substituted by hydroxy or methoxy;
2. a mono- or dicycloalkylamine which is unsubstituted or substituted by alkyl of from 1 to 8 carbon atoms or hydroxylower-alkyl;
3. a mononuclear, mono- or diaralkylamine which is unsubstituted or substituted by alkyl which is unsubstituted or substituted by hydroxy, methoxy or cyano;
4. a mononuclear aromatic amine;
5. benzamidine, or an alkylamidine having from 2 to 18 carbon atoms in the alkyl radical and which may be substituted by alkyl of from 1 to 4 carbon atoms, phenyl, benzyl or cyclohexyl;
6. an isothiourea S-substituted by benzyl or alkyl of from 1 to 18 carbon atoms;
7. an N-containing five- or six-membered heterocycle and
8. a condensed N-containing heterocycle; and n represents the number 1 or 2, (I) in a solvent which consists of non-polar aprotic organic solvent selected from unsubstituted or halogenated hydrocarbons having a boiling point above 30° C, or
(II) in a solvent mixture which consists of
(α) non-polar aprotic organic solvent selected fron unsubstituted or halogenated hydrocarbon having a boiling point above 30° C and
(β) a polar organic solvent selected from the group consisting of alkanols, cycloaliphatic alcohols, araliphatic alcohols, aliphatic or cycloaliphatic ketones, alkylene glycol monoalkyl ethers, furfuryl alcohol, tetrahydrofurfuryl alcohol, bivalent aliphatic alcohols, lower cyclic ethers, lower anhydrous monocarboxylic acids, N,N-dialkylamides of lower monocarboxylic acids, amides of carbonic acid, cyclic amides, lower carboxylic acid nitriles and mixtures thereof; at a temperature between room temperature and the boiling point of the solvent or solvent mixture, and
(b) finishing the dyed material by removing excess solvent and drying.

3. A process as described in claim 2 wherein said organic fibre material is fibre material made from synthetic polyamide.

4. A process as described in claim 2 wherein the non-polar aprotic organic solvent is a halogenated, particularly chlorinated lower aliphatic hydrocarbon.

5. A process as described in claim 2 wherein the polar organic solvent defined under (IIβ) is selected from the group consisting of methanol, ethanol, n-propanol, iso-propanol, butanols, pentanols, cyclohexanol, benzyl alcohol, acetone, methylethyl ketone, cyclohexanone, ethylene glycol monomethyl ether, ethylene glycol monoethyl ether, furfuryl alcohol, tetrahydrofurfuryl alcohol, ethylene glycol, 1,2-propylene glycol, dioxane, formic acid, glacial acetic acid, propionic acid, dimethyl formamide, dimethyl acetamide, N,N,N',N'-tetramethyl urea, N-methylpyrrolidone, acetonitrile and mixture of such solvents.

6. A process as described in claim 2 wherein the solvent described under (IIβ) is a liquid which is miscible with water in any proportion.

7. A process as described in claim 2 wherein the solvent mixture defined under (II) consists of about 90% by weight of tri- or tetrachloroethylene, the balance consisting of N,N-dialkylamide of a lower monocarboxylic acid.

8. A process as described in claim 1, further comprising thickener admixed with said solvent (I) or solvent mixture (II).

9. A process as described in claim 1, wherein said impregnated or printed material is subjected to intermediate drying before fixing the dyestuff.

10. A process as described in claim 1, wherein said organic fibre material is fibre material made from synthetic polyamide.

11. A process as described in claim 1, wherein the non-polar aprotic organic solvent is a halogenated, particularly chlorinated lower aliphatic hydrocarbon.

12. A process as described in claim 1, wherein the polar organic solvent defined under (IIβ) is selected from the group consisting of methanol, ethanol, n-propanol, iso-propanol, butanols, pentanols, cyclohexanol, benzyl alcohol, acetone, methylethyl ketone, cyclohexanone, ethylene glycol monomethyl ether, ethylene glycol monoethyl ether, furfuryl alcohol, tetrahydrofurfuryl alcohol, ethylene glycol, 1,2-propylene glycol, dioxane, formic acid, glacial acetic acid, propionic acid, dimethyl formamide, dimethyl acetamide, N,N,N',N'-tetramethyl urea, N-methylpyrrolidone, acetonitrile and mixtures of such solvents.

13. A process as described in claim 1, wherein the solvent described under (IIβ) is a liquid which is miscible with water in any proportion.

14. A process as described in claim 1, wherein the solvent mixture defined under (II) consists of about 90% by weight of tri- or tetrachloroethylene, the balance consisting of N,N-dialkylamide of a lower monocarboxylic acid.

* * * * *